(12) United States Patent
Pino et al.

(10) Patent No.: US 7,345,446 B2
(45) Date of Patent: Mar. 18, 2008

(54) METHOD OF CONTROLLING MOVABLE MEMBER DRIVEN BY ELECTRIC MOTOR

(75) Inventors: Rafael Jimenez Pino, Valls (ES); Montserrat Angles, Valls (ES)

(73) Assignee: Lear Corporation, Southfield, MI (US)

( * ) Notice: Subject to any disclaimer, the term of this patent is extended or adjusted under 35 U.S.C. 154(b) by 21 days.

(21) Appl. No.: 11/277,784

(22) Filed: Mar. 29, 2006

(65) Prior Publication Data

US 2007/0194737 A1   Aug. 23, 2007

Related U.S. Application Data

(60) Provisional application No. 60/774,731, filed on Feb. 17, 2006.

(51) Int. Cl.
    *G05B 5/00* (2006.01)
(52) U.S. Cl. .................. 318/466; 318/611; 318/636; 318/629
(58) Field of Classification Search ............ 318/466, 318/611, 636, 629, 635, 432, 433, 434, 459; 360/32; 73/117.3; 375/355
    See application file for complete search history.

(56) References Cited

U.S. PATENT DOCUMENTS

| | | | |
|---|---|---|---|
| 6,434,205 B1 * | 8/2002 | Taura et al. | 375/355 |
| 6,591,666 B1 * | 7/2003 | Kacewicz et al. | 73/117.3 |
| 2004/0098213 A1 | 5/2004 | Gerlach | |
| 2004/0107071 A1 | 6/2004 | Gerlach | |
| 2004/0111233 A1 | 6/2004 | Gerlach | |
| 2006/0006822 A1 | 1/2006 | Kro et al. | |

FOREIGN PATENT DOCUMENTS

| | | |
|---|---|---|
| EP | 0997341 A1 | 5/2000 |
| EP | 1453172 A1 | 9/2004 |
| EP | 1471629 A3 | 5/2006 |
| GB | 2060944 A | 5/1981 |
| WO | 2006111144 A1 | 10/2006 |

OTHER PUBLICATIONS

Great Britain Search Report, mailed May 30, 2007, 5 pages.

* cited by examiner

*Primary Examiner*—Karen Masih
(74) *Attorney, Agent, or Firm*—Brooks Kushman P.C.

(57) ABSTRACT

Method of controlling a movable member driven by an electric motor by monitoring current circulating through the electric current and ripples therein. The method including detecting current peaks and count the number of current peaks falling within sampling windows such that the number of current peaks falling within the sampling windows are used to determine an angular position of the electric motor for use in facilitating the control thereof.

20 Claims, 2 Drawing Sheets

METHOD OF CONTROLLING MOVABLE MEMBER DRIVEN BY ELECTRIC MOTOR

CROSS-REFERENCE TO RELATED APPLICATION

This application claims the benefit of U.S. provisional application Ser. No. 60/774,731 filed Feb. 17, 2006.

BACKGROUND OF THE INVENTION

1. Field of the Invention

The present invention relates to method of controlling movable members driven by an electric motor.

2. Background Art

Different systems and methods for controlling a mobile member driven by a multi-pole permanent magnet direct current electric motor are known, making use of the undulations produced in the consumption current thereof as it circulates through each one of the inductors forming it.

Patent application GB-A-2060944 proposes a device to control the position of a seat moved by a multi-pole motor. By means of the monitoring of the current circulating through the different poles of the motor, the counting of pulses generated by each one of the poles is carried out and is compared with a reference, which enables determining the seat position. A memory is proposed which has stored therein a series of desired positions which can be selected to force the seat to move until it reaches the selected position. Said memory, as well as the logic used by the device, are integrated in a microprocessor.

A similar but somewhat more advanced proposal is that carried out by patent application EP-A-0997341, which relates to a control device for a movable member including a direct current motor, said device operating such that it memorizes a specific position of the movable member, and although the member is moved to another position, it can be returned to the memorized position by means of a simple switching operation. A pulse generating circuit according to the ripple of said motor, for finding out the position of the movable member at all times and to thus compare it with the memorized position so as to actuate the motor in one direction or the other until reaching said memorized position, is also proposed. The proposed control allows adjusting the movable member, such as a seatback, for example, to different user profiles. To offset the movements of the motor due to inertia, the memorization of a series of correction values which have been experimentally obtained for different motors is proposed.

Although said second background document, unlike the first one, takes into account the movements of the motor not produced by the application of voltage, but rather by inertia, it does not contemplate any other type of causes which can distort the measurements obtained when monitoring the intensity, such as interferences. Nor does it develop a method for achieving said position correction, but rather it simply explains that the memorized correction values have been obtained experimentally.

None of said background documents takes into account either the different behavior of the motor depending on whether said motor is operating in a transient state, such as the start-up, or in a steady state.

SUMMARY OF THE INVENTION

One non-limiting aspect of the present invention relates to a method of controlling a movable member driven by an electric motor, wherein the movable member is controlled as a function an angular position of the electric motor. The method may include determining peaks of current circulating through the electric motor, positioning sampling windows to count peaks falling within a particular time interval defined by a boundary of the sampling windows, determining the angular position of the electric motor as a function of the number of peaks counted within the sampling windows, and adjusting positioning of the sampling windows as a function of peaks falling outside the boundaries thereof.

One non-limiting aspect of the present invention relates to a method of ripple detection. The method may include determining peaks of current circulating through an electric motor, positioning sampling windows to count peaks falling within the boundaries thereof, counting the number of peaks falling within the sampling windows, and adjusting positioning of the sampling windows as a function of peaks falling outside the boundaries thereof.

One non-limiting aspect of the present invention relates to a method of controlling a movable member driven by an electric motor, wherein the movable member is controlled as a function an angular position of the electric motor. The method may include positioning sampling windows to count zero-crossings of a mean current value associated with the current circulating through the electric motor, the sampling windows defining boundaries within which the zero-crossing fall if the zero-crossing coincide with the sampling windows, determining the angular position of the electric motor as a function of the number of zero-crossings counted within the sampling windows, and adjusting positioning of the sampling windows as a function of zero-crossings falling outside the boundaries thereof, wherein adjusting the positioning of the sampling windows may include:

(i) selecting a period variation between successive sampling windows;

(ii) positioning the sampling windows to correspond with the selected period variation;

(iii) adjusting the period variation between sampling windows in response to detecting one of the zero-crossings to be a late zero-crossing, the late zero-crossing falling after one of the sampling windows such that the period variation between sampling windows is adjusted to correspond with an elapse time between the late zero-crossing and the first zero-crossing occurring thereafter.

The above features and advantages, along with other features and advantages of the present invention, are readily apparent from the following detailed description of the invention when taken in connection with the accompanying drawings.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENTS

Figure 1:
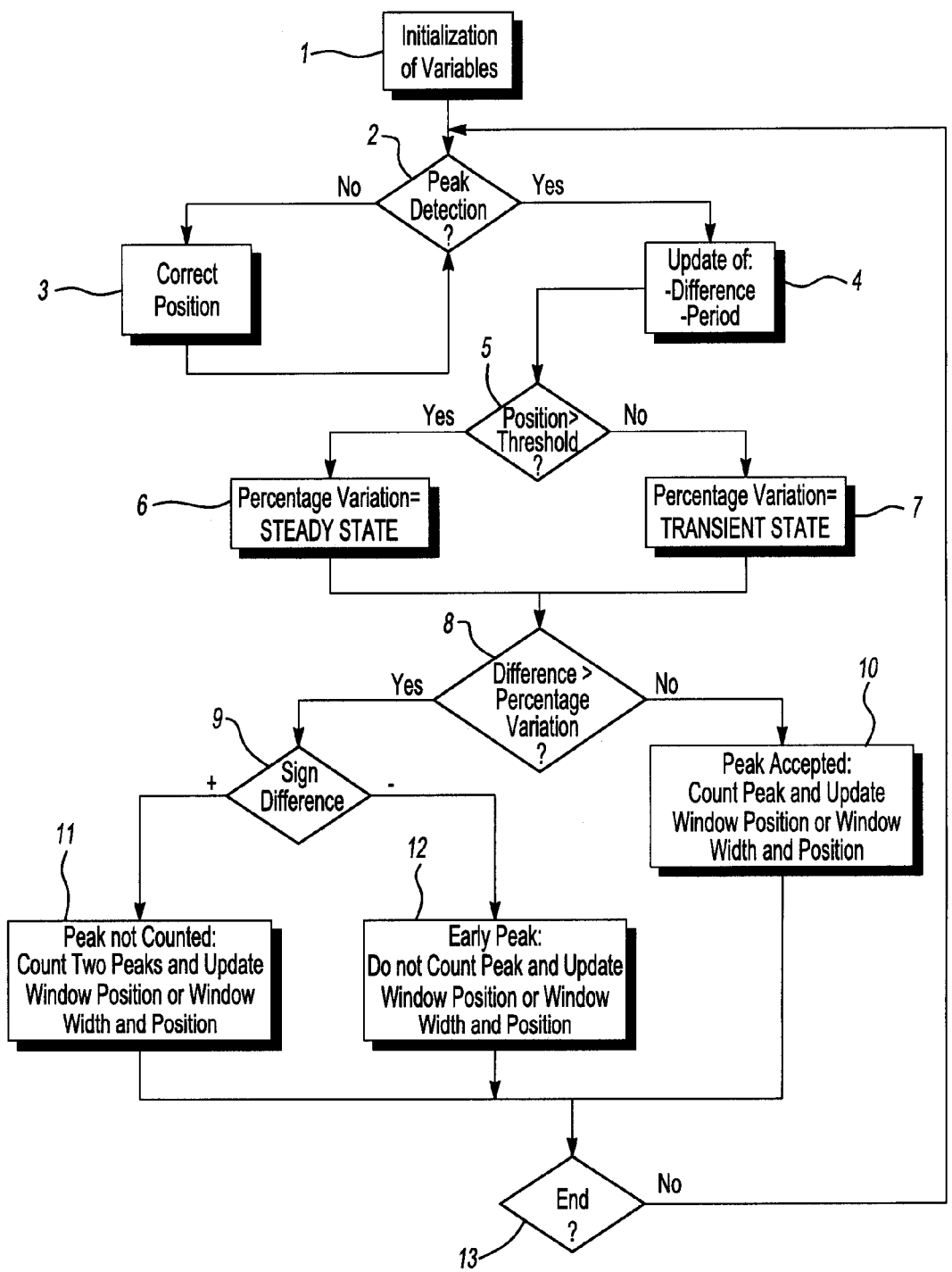
FIG. 1 illustrates a flowchart of a method for controlling operation of a movable member driven by an electric motor in accordance with one non-limiting aspect of the present invention.

FIG. 1 illustrates a flowchart of a method for controlling operation of a movable member driven by an electric motor in accordance with one non-limiting aspect of the present invention. The method generally relates to analyzing ripples in current circulating through an electric motor and determining the angular position of the motor as a function thereof, such as to facilitate controlling movements and other operations associated therewith.

As indicated in Box 1 of FIG. 1, prior to carrying out any detection, the method comprises carrying out a step for initializing a series of variables. Said variables are in reference to a given time threshold, an initial period, and an initial position and width of said sampling window.

After said initial step, a series of steps 2-13 are carried out, which will be repeated continuously in loop form, unless it is desired to end the process.

As a result, the following explanation makes reference not only to the first peak to be detected, but also to those which follow.

Following the flow chart of FIG. 1, a Question 2 is reached in which a question is asked to check whether an intensity peak of current circulating through the electric motor has been detected or not. If such detection has not occurred, the position of the sampling window is corrected in order to reattempt the detection, and the success or not of said attempt is checked by means of the return to Question 2.

If the response to Question 2 is positive, the method passes on to the step indicated in FIG. 1 as step 4, in which a variable related to the period ranging to said detected peak (from zero if it is the first peak, or from the previous peak if this is not the case) and a variable related to the difference between said period ranging to said detected peak and the immediately foregoing period (which corresponds to the initial period for the case that it is the first time it passes through Box 4), are updated (or initialized if it is the first time it passes through Box 4).

After said step 4, the method comprises identifying whether said motor is operating in a transient or steady state according to whether the detection of the intensity peak occurs before or after said given time threshold pre-set in step 1. Such a situation is reflected in Boxes 5, 6 and 7.

In Box 5, the time position of the sampling window (which, after the detection has occurred, coincides with the position of the detected peak or at least with the upward slope ending in said peak and the detection of which is enough to consider that a peak has occurred) is compared with the time threshold value, and if the result of such comparison is indicative that the sampling window is beyond said time threshold, it is established that the motor is operating in a steady state 7. If this is not the case, it is established that the motor is in a transient sate 6, given that not enough time has elapsed for it to have entered in a stable operating area.

Generally, path 5-6 will be followed for at least the first of the peaks, or start-up peak, although this will preferably be the case (upon consecutively entering said loop) for several initial peaks (the number will depend on the value which has been established for the time threshold).

For subsequent peaks, path 5-7 will be followed, given that the steady state will have been entered, and this will not be abandoned unless the motor stops, in which case when it is started up again, both circumstances (path 5-6 for the initial peaks and 5-7 for the subsequent peaks) will occur again.

After determining which operating state the motor is in by means of the proposed method, the step indicated as 8 in FIG. 1 is followed.

In it, the value of the variable (initialized or updated in step 4) relating to the difference between the period ranging from said detected peak and the immediately foregoing period is compared with a given percentage value, as illustrated in Box 8 of FIG. 1.

If the result of said comparison results in the difference being smaller in modulus than said given percentage value the peak has fallen within the sampling window, as expected. Therefrom, the method comprises accepting and counting the detected peak and updating the position, or the width and the position, of said window to detect the following peak. That is, the path to be followed goes from Box 8 to Box 10.

Reaching Box 10 means that the periods of the different individual waves are not very different from one another (especially if already in the transient state). This is why when, after the detection of a peak, the period for which it was detected is compared with the immediately foregoing period and they do not show large differences, it is considered, by applying the proposed method, that we are in said situation, i.e. that the detected peak actually corresponds to that produced by the passage of the intensity through an inductor and occurred within the sampling window as predicted, and therefore, as has been stated, this peak is counted and the position, or the width and the position, of said window is updated to detect the following peak.

On the contrary, if the result of the comparison carried out in step 8 results in said difference being greater in modulus than said given percentage value, the proposed method comprises finding out the sign of said difference (Box 9 of FIG. 1). In more detail, the sign indicates whether the peak falls before or after the associated sampling window. A sign of positive is determined if the peak falls after the sampling window and a sign of negative is determined if the peak falls before the sampling window.

If said sign is positive, the method moves on to step 11, which comprises accepting and counting said detected peak (late peak) and another additional peak (lost peak), considered as lost (or not counted) and prior to the detected peak, and updating the position (period variation), or the width and the position, of the window to detect the following peak, i.e. forward.

Such a consideration is reached due to such a result from the question asked in step 9 being indicative of the lapse of a considerably longer period of time than that corresponding to the period of one of the individual waveforms, whereby it is deduced that a peak which actually occurred has been lost, i.e. not detected. Such loss may have been caused by several motives, one of which is the masking of the peak by a high frequency interference.

If said sign is negative, the method goes from step 9 to step 12, which comprises rejecting and not counting said detected early peak, as it is considered to be a product of an interference, and updating the position, or the width and the position, of the window in order to attempt to carry out a detection based on the last accepted peak, i.e. at least moving the sampling window backwards in order to attempt the detection again without it being altered by the interference. For the comparison carried out in step 8, said given percentage value is different if said motor is operating in a transient state or steady state. Generally, it is approximately equal to 70% if the motor is operating in the transient state and approximately equal to 50% if it is operating in the steady state.

This is because, as previously pointed out, when in the steady state, the differences between the periods of the individual waveforms of the consumption intensity referring to each one of the inductors forming the motor are very similar. However, in the transient state, the differences are greater. This is why a difference of less than 70% is not considered to be indicative of an anomalous situation for the case of the motor operating in the transient state.

The last Box 13 of the flow chart of FIG. 1 simply asks whether it is desired to end the running of the method or, on the contrary, it is desired to continue detecting the following peaks.

Figure 2:
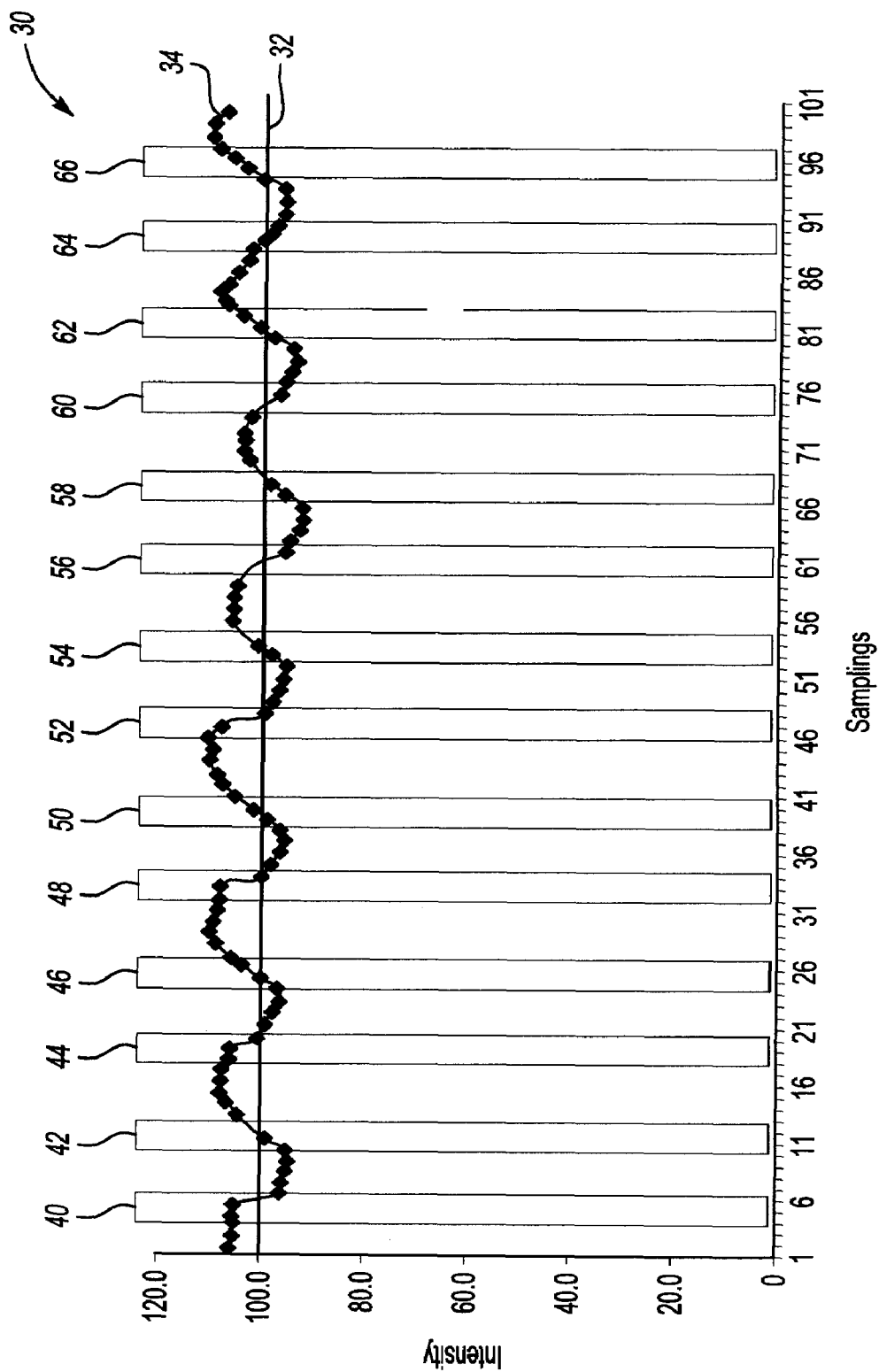
FIG. 2 illustrates a graph of a portion of a consumption intensity of the current circulating through the motor in accordance with one non-limiting aspect of the present invention.

FIG. 2 illustrates a graph 30 of a portion of a consumption intensity of the current circulating through the motor in accordance with one non-limiting aspect of the present invention. The graph 30 illustrates the current once the motor is in steady state, in which several individual waveforms with periods very similar to one another can be seen.

Said figure also shows the mean value of said consumption intensity 32 versus actual current intensity 34, as well as a series of sampling windows 40-66 which, in reality, correspond to different time positions and widths of a single sampling window.

It can be observed how the windows are focused towards the areas of the graph 30 in which intersections occur between the consumption intensity and the representation of their mean value, a situation indicated in the graph as a zero-crossing detection.

Such detection is one possible way to detect the beginning and the end of each period, as well as the different intensity peaks, which for the embodiment example shown in FIG. 2, are indirectly detected upon detection of the upward slope ending in a positive peak or the downward slope ending in a negative peak.

This manner of arranging and positioning the sampling window is to be understood as one of the several possible manners of doing so, being able to focus the detection on just the positive peaks (or just the negative peaks) and therefore requiring working with only half of the positions for the sampling window of those shown in FIG. 2.

Accordingly, the zero-crossings are considered peaks as they represent peak periods between ripples that may be related to angular positioning of the motor, as one having ordinary skill in the art will appreciate. The sampling windows 40-66 are logical entities used to facilitate counting the number of peaks occur over a particular period of time.

In more detail, the boundaries of the sampling windows 40-66, as described above, are positioned according to expected current peaks and an acceptable interval of time such that peaks falling within the windows 40-66 are counted and used for determining angular positioning and peaks falling outside thereof are analyzed for use in adjusting positioning and/or width (time interval) of the sampling windows 40-66. The positioning of the windows 40-66, as also described above, may be adjusted as a function of the peaks falling outside thereof, such as to compensate for operational variations and other factors associated with motor operations.

For a preferred embodiment example, the position of the sampling window 40-66 for detecting such peaks may be positioned elsewhere along the graph 30, such as directly on the apex of a peak to be detected (not shown) rather than on the slope leading thereto.

As demonstrated above, one non-limiting aspect of the present invention relates to an alternative to the state of the art which makes use of said monitoring of the intensity circulating through a multi-pole motor driving a movable member, and the corresponding counting of peaks produced as it circulates through each one of the inductors forming part of the motor, to determine the angular position thereof, offers a way to improve said position determination, taking into account both the operating state of the motor and the distortions produced by unwanted interferences, and enables offsetting said distortions.

To that end, in a first aspect, the present invention relates to a method for controlling a movable member driven by an electric motor, applicable to an automotive vehicle, said electric motor being a multi-pole permanent magnet DC motor.

Said method is of the type comprising identifying the angular position of said electric motor by means of the identification of the inductors of the motor which cause, upon acting, given individual waveforms in the consumption intensity, each one of them including at least one intensity peak, the total waveform of the consumption intensity of the motor for a complete angular travel thereof being the sequential sum of said individual waveforms.

The method comprises monitoring the intensity circulating through the electric motor by means of a sampling window to detect and count said peaks of said circulating intensity, each one of them corresponding to one of said individual waveforms, adjusting the position, or the width and the position, of said window according to the percentage and sign of variation of periods between several consecutive peaks.

The method also comprises identifying if said motor is operating in a transient or steady state according to whether the detected intensity peak occurs before or after a given time threshold.

Generally, once the motor is operating in a transient state, the periods of the different individual waves are not very different from one another. For this reason, when after the detection of a peak, the period for which it has been detected is compared with the one immediately prior to it, and these periods do not present major differences, it is considered, by applying the proposed method, that it is in said situation, i.e. that the detected peak actually corresponds to the peak produced by the passing of the intensity through an inductor, and therefore this peak is counted and the position, or the width and the position, of said window is updated to detect the next peak.

On the contrary, if a difference considered to be too large so as to correspond to that of two periods of two consecutive waves is detected, it is considered that, depending on the sign of such difference, either a peak produced by an interference, and not an inductor, has been detected, or a peak actually produced by an inductor has not been detected.

It is thus achieved that the angular position of the motor is determined at all times in a precise manner, said determination not being affected by interferences producing false readings, by either masking peaks produced by the inductors or producing peaks which, without the application of the proposed method, would give rise to erroneous readings by mistaking them for those produced when the intensity circulates through an inductor.

By means of knowing the angular position, the motor, and therefore the associated mobile member, could be controlled in order to move it to a desired position, as was done in the mentioned background documents.

A second aspect of the present invention relates to a system for controlling a movable member operated by a multi-pole DC electric motor, applicable to an automotive vehicle, adapted to carry out said identification of the angular position of the electric motor by means of the application for the method proposed according to the first aspect of the invention.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of controlling a movable member driven by an electric motor, wherein the movable member is controlled as a function of an angular position of the electric motor, the method comprising:
    determining peaks of current circulating through the electric motor;
    positioning sampling windows to count peaks falling within a particular time interval defined by a boundary of the sampling windows;
    determining the angular position of the electric motor as a function of the number of peaks counted within the sampling windows;
    adjusting positioning of the sampling windows as a function of peaks falling outside the boundaries thereof; and
    re-determining the angular position of the electric motor as a function of the number of peaks counted within the adjusted sampling windows.

2. The method of claim 1 further comprising determining the peaks to correspond with zero-crossings of a mean current value of the current circulating through the electric motor.

3. The method of claim 1 further comprising selecting a period variation between successive sampling windows and positioning the sampling windows to correspond with the selected period variation.

4. The method of claim 3 further comprising adjusting the period variation between sampling windows in response to detecting one of the peaks to be a late peak, the late peak falling after one of the sampling windows.

5. The method of claim 4 further comprising adjusting the period variation between sampling windows to correspond with an elapse time between the late peak and the first peak occurring thereafter.

6. The method of claim 4 further comprising counting the late peak and a lost peak when determining the angular position.

7. The method of claim 3 further comprising selecting the period variation between successive sampling windows as a function of whether the electric motor is in steady-state or transient modes of operations.

8. The method of claim 7 further comprising defining the period variation to correspond with a percentage value associated with a difference in time between successive current peaks.

9. The method of claim 8 further comprising selecting the percentage value to be 50% for steady-state conditions and 70% for the transient conditions.

10. The method of claim 1 further comprising ignoring peaks falling before one of the sampling windows.

11. A method of ripple detection, the method comprising:
    determining peaks of current circulating through an electric motor;
    positioning sampling windows to count peaks falling within the boundaries thereof;
    counting the number of peaks falling within the sampling windows; and
    adjusting positioning of the sampling windows as a function of peaks falling outside the boundaries thereof.

12. The method of claim 11 further comprising determining the peaks to correspond with zero-crossings of a mean current value of the current circulating through the electric motor.

13. The method of claim 11 further comprising selecting a period variation between successive sampling windows and positioning the sampling windows to correspond with the selected period variation.

14. The method of claim 13 further comprising adjusting the period variation between sampling windows in response to detecting one of the peaks to be a late peak, the late peak falling after one of the sampling windows.

15. The method of claim 14 further comprising adjusting the period variation between sampling windows to correspond with an elapse time between the late peak and the first peak occurring thereafter.

16. The method of claim 14 further comprising counting the late peak and a lost peak when determining the angular position.

17. The method of claim 13 further comprising selecting the period variation between successive sampling windows as a function of whether the electric motor is in steady-state or transient modes of operations.

18. The method of claim 17 further comprising defining the period variation to correspond with a percentage value associated with a difference in time between successive current peaks.

19. The method of claim 18 further comprising selecting the percentage value to be 50% for steady-state conditions and 70% for the transient conditions.

20. A method of controlling a movable member driven by an electric motor, wherein the movable member is controlled as a function an angular position of the electric motor, the method comprising:
    positioning sampling windows to count zero-crossings of a mean current value associated with the current circulating through the electric motor, the sampling windows defining boundaries within which the zero-crossing fall if the zero-crossing coincide with the sampling windows;
    determining the angular position of the electric motor as a function of the number of zero-crossings counted within the sampling windows; and
    adjusting positioning of the sampling windows as a function of zero-crossings falling outside the boundaries thereof, wherein adjusting the positioning of the sampling windows includes:
    (i) selecting a period variation between successive sampling windows (ii) positioning the sampling windows to correspond with the selected period variation;
(iii) adjusting the period variation between sampling windows in response to detecting one of the zero-crossings to be a late zero-crossing, the late zero-crossing falling after one of the sampling windows such that the period variation between sampling windows is adjusted to correspond with an elapse time between the late zero-crossing and the first zero-crossing occurring thereafter.

* * * * *